(12) United States Patent
Koveal, Jr. et al.

(10) Patent No.: US 9,504,998 B2
(45) Date of Patent: Nov. 29, 2016

(54) GENERATING CATALYSTS FOR FORMING CARBON ALLOTROPES

(71) Applicants: ExxonMobil Upstream Research Company, Houston, TX (US); Solid Carbon Products LLC, Provo, UT (US)

(72) Inventors: Russell J. Koveal, Jr., Baton Rouge, LA (US); Dallas B. Noyes, Provo, UT (US); Terry A. Ring, Sandy, UT (US)

(73) Assignees: EXXONMOBIL UPSTREAM RESEARCH COMPANY, Houston, TX (US); SOLID CARBON PRODUCTS, LLC, Provo, UT (US)

( * ) Notice: Subject to any disclaimer, the term of this patent is extended or adjusted under 35 U.S.C. 154(b) by 0 days.

(21) Appl. No.: 14/395,446

(22) PCT Filed: Apr. 10, 2013

(86) PCT No.: PCT/US2013/035982
§ 371 (c)(1),
(2) Date: Oct. 17, 2014

(87) PCT Pub. No.: WO2013/158439
PCT Pub. Date: Oct. 24, 2013

(65) Prior Publication Data
US 2015/0093323 A1    Apr. 2, 2015

Related U.S. Application Data

(60) Provisional application No. 61/625,673, filed on Apr. 18, 2012.

(51) Int. Cl.
*B01J 37/00* (2006.01)
*B01J 8/18* (2006.01)
(Continued)

(52) U.S. Cl.
CPC ........... *B01J 37/0072* (2013.01); *B01J 8/1827* (2013.01); *B01J 23/745* (2013.01);
(Continued)

(58) Field of Classification Search
CPC ........ B01J 23/755; B01J 37/12; B01J 37/16; B01J 23/745; B01J 27/22; B01J 35/023; B01J 37/0036; B01J 8/1827; B01J 25/00; B01J 35/10; B01J 37/0072; B01J 37/0018; B01J 2208/00893; C01B 31/0233; B82Y 30/00; B82Y 40/00
USPC ...... 423/447.3; 422/139, 242; 502/100, 300, 502/301
See application file for complete search history.

(56) References Cited

U.S. PATENT DOCUMENTS 2,865,865 A * 12/1958 Ockrent ................... B01J 25/02
                                                                    502/172
2,939,883 A *  6/1960 Punderson .............. C07C 45/49
                                                                    502/240

(Continued)

FOREIGN PATENT DOCUMENTS

JP         2006-27948 A      2/2006
WO    WO/2010/120581 A1    10/2010

OTHER PUBLICATIONS

Baddour, Carole et al., Direct and repetitive growth cycles of carbon nanotubes on stainless steel particles by chemical vapor deposition in a fluidized bed. Carbon, Mar. 25, 2010, vol. 48, pp. 2652-2656.

(Continued)

*Primary Examiner* — Daniel C McCracken
(74) *Attorney, Agent, or Firm* — International IP Law Group, P.L.L.C.

(57) ABSTRACT

A system and methods for forming carbon allotropes are described. The system includes a reactor configured to use a catalyst to form a carbon allotrope from a feed stock in a Bosch reaction. The catalyst includes a roughened metal surface.

22 Claims, 9 Drawing Sheets

(51) Int. Cl.
| | |
|---|---|
| *B01J 35/10* | (2006.01) |
| *B01J 23/755* | (2006.01) |
| *B01J 37/12* | (2006.01) |
| *B01J 37/16* | (2006.01) |
| *B01J 23/745* | (2006.01) |
| *B01J 27/22* | (2006.01) |
| *B01J 35/02* | (2006.01) |
| *C01B 31/02* | (2006.01) |
| *B82Y 30/00* | (2011.01) |
| *B82Y 40/00* | (2011.01) |
| *B01J 25/00* | (2006.01) |

(52) U.S. Cl.
CPC ............ *B01J 23/755* (2013.01); *B01J 25/00* (2013.01); *B01J 27/22* (2013.01); *B01J 35/023* (2013.01); *B01J 35/10* (2013.01); *B01J 37/0036* (2013.01); *B01J 37/12* (2013.01); *B01J 37/16* (2013.01); *B82Y 30/00* (2013.01); *B82Y 40/00* (2013.01); *C01B 31/0233* (2013.01); *B01J 37/0018* (2013.01); *B01J 2208/00893* (2013.01); *B01J 2208/00938* (2013.01); *Y02P 20/129* (2015.11)

(56) References Cited

U.S. PATENT DOCUMENTS

| | | |
|---|---|---|
| 4,650,657 A | 3/1987 | Brooks |
| 5,316,747 A | 5/1994 | Pow et al. |
| 5,559,066 A * | 9/1996 | Poepel .................... B01J 23/94 502/20 |
| 8,679,444 B2 | 3/2014 | Noyes |
| 2003/0147802 A1 | 8/2003 | Smalley et al. |
| 2007/0253886 A1 | 11/2007 | Abatzoglou et al. |
| 2009/0074634 A1 | 3/2009 | Tada et al. |
| 2009/0246367 A1 | 10/2009 | Huotari et al. |
| 2010/0255985 A1 * | 10/2010 | Gaffney ................ B01J 23/002 502/312 |
| 2011/0168394 A1 | 7/2011 | Roes et al. |
| 2012/0034150 A1 | 2/2012 | Noyes |

OTHER PUBLICATIONS

Huang et al., A review of the large scale production of carbon nanotubes: The practice of nanoscale process engineering. Chinese Science Bulletin, 57(2-3): 157-166. Jan. 2012.

Karthikeyan, et al., Large Scale Synthesis of Carbon Nanotubes. E-Journal of Chemistry, 2009, 6(1), 1-12.

Masarapu et al., Direct Growth of Aligned Multiwalled Carbon Nanotubes on Treated Stainless Steel Substrates. Langmuir, Jun. 9, 2007, vol. 23, pp. 9046-9049.

PCT International Preliminary Report on Patentability, dated Jun. 13, 2014, for PCT Application PCT/US13/35982, Filed Apr. 10, 2013.

PCT International Search Report, dated Sep. 30, 2013, for PCT Application PCT/US13/35982, Filed Apr. 10, 2013.

Vander Wal, R.L., et al., Flame Synthesis of Single-Walled Carbon Nanotubes and Nanofibers. Seventh International Workshop on Microgravity Combustion and Chemically Reacting Systems, Aug. 2003, 73-76 (NASA Research Publication: NASA/CP-2003-212376/REV1).

Written Opinion of the International Search Authority, dated Sep. 30, 2013, for PCT Application PCT/ US13/35982, Filed Apr. 10, 2013.

Young-Ki Ko et al., Nanocrystallized steel surface by micro-shot peening for catalyst-free carbon nanotube growth. Materials Research Bulletin, Dec. 28, 2009, vol. 45, pp. 343-347.

* cited by examiner

800

GENERATING CATALYSTS FOR FORMING CARBON ALLOTROPES

CROSS REFERENCE TO RELATED APPLICATIONS

Pursuant to 35 U.S.C. §371, this application is a United States National Stage Application of International Patent Application No. PCT/US2013/035982, filed on 10 Apr. 2013, which claims priority based on U.S. Provisional Application Ser. No. 61/625,673, filed 18 Apr. 2012, titled "Generating Catalysts For Forming Carbon Allotropes" the contents of which are incorporated by reference as if set forth in their entirety herein. The previous provisional application is related to U.S. patent application Ser. No. 13/263,311 by Noyes and titled "Method for Producing Solid Carbon by Reducing Carbon Oxides," which was filed 6 Oct. 2011, which claims priority based on International Patent Application Number PCT/US2010/029934, by Noyes, entitled "Method for Producing Solid Carbon by Reducing Carbon Oxides," which was filed on 5 Apr. 2010, which in turn claims priority based on U.S. Provisional Patent Application Ser. No. 61/170,199 filed 17 Apr. 2009 and titled "Method for Producing Solid Carbon by Reducing Carbon Oxides," the disclosures of all of which are incorporated herein by this reference.

FIELD

The present techniques relate to an industrial scale process for forming carbon allotropes. More specific, techniques are for generating catalysts that can be used for the formation of carbon allotropes, such as carbon nanotubes.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Materials formed predominately of solid or elemental carbon have been used in numerous products for many years. For example, carbon black is a high carbon content material used as a pigment and reinforcing compound in rubber and plastic products, such as car tires. Carbon black is usually formed by the incomplete thermal pyrolysis of hydrocarbons, such as methane or heavy aromatic oils. Thermal blacks, formed by the pyrolysis of natural gas, include large unagglomerated particles, for example, in the range of 200-500 nm in size, among others. Furnace blacks, formed by the pyrolysis of heavy oils, include much smaller particles, in the range of 10-100 nm in size, that agglomerate or stick together to form structures. In both cases, the particles may be formed from layers of graphene sheets that have open ends or edges. Chemically, the open edges form reactive areas that can be used for absorption, bonding into matrices, and the like.

More recent forms of elemental carbon, such as fullerenes, have been developed, and are starting to be developed in commercial applications. In contrast to the more open structures of carbon black, fullerenes are formed from carbon in a closed graphene structure, i.e., in which the edges are bonded to other edges to form spheres, tubes, and the like. Two structures, carbon nanofibers and carbon nanotubes, have numerous potential applications, ranging from batteries and electronics to the use in concrete in the construction industry. Carbon nanomaterials may have a single wall of graphene or multiple nested walls of graphene or form a fiber structure from a stacked set of sheets in a cup or plate form. The ends of the carbon nanotubes are often capped with hemispherical structures, in a fullerene-like configuration. Unlike for carbon black, large scale production processes have not been implemented for carbon nanomaterials. However, research has been conducted on a number of proposed production processes.

Arc-based, laser-based ablation techniques and chemical vapor deposition have classically been used to generate carbon nanotubes from a carbon surface. For example, techniques for generating carbon nanotubes are reviewed in Karthikeyan, et al., "Large Scale Synthesis of Carbon Nanotubes," E-Journal of Chemistry, 2009, 6(1), 1-12. In one technique described, an electric arc is used to vaporize graphite from electrodes in the presence of metal catalysts, achieving production rates of about 1 gram/min. Another technique described uses laser ablation to vaporize carbon from a target electrode in an inert gas stream. However, the laser technique uses high purity graphite and high power lasers, but provides a low yield of carbon nanotubes, making it impractical for large scale synthesis. A third technique described by the authors, is based on chemical vapor deposition (CVD), in which a hydrocarbon is thermally decomposed in the presence of a catalyst. In some studies, these techniques have achieved production rates of up to a few kilograms/hour at a 70% purity level. However, none of the processes described are practical for large scale commercial production.

Hydrocarbon pyrolysis is used in the production of carbon black and various carbon nanotube and fullerene products. Various methods exist for creating and harvesting various forms of solid carbon through the pyrolysis of hydrocarbons using temperature, pressure, and the presence of a catalyst to govern the resulting solid carbon morphology. For example, Kauffman et al. (U.S. Pat. No. 2,796,331) discloses a process for making fibrous carbon of various forms from hydrocarbons in the presence of surplus hydrogen using hydrogen sulfide as a catalyst, and methods for collecting the fibrous carbon on solid surfaces. Kauffman also claims the use of coke oven gas as the hydrocarbon source.

In another study, a flame based technique is described in Vander Wal, R. L., et al., "Flame Synthesis of Single-Walled Carbon Nanotubes and Nanofibers," Seventh International Workshop on Microgravity Combustion and Chemically Reacting Systems, August 2003, 73-76 (NASA Research Publication: NASA/CP-2003-212376/REV1). The technique used the introduction of a CO or $CO/C_2H_2$ mixture into a flame along with a catalyst to form the carbon nanotubes. The authors noted the high productivity that could be achieved using flame based techniques for the production of carbon black. However, the authors noted that scaling the flame synthesis presented numerous challenges. Specifically, the total time for catalyst particle formation, inception of the carbon nanotubes, and growth of the carbon nanotubes was limited to about 100 ms.

International Patent Application Publication WO/2010/120581, by Noyes, discloses a method for the production of various morphologies of solid carbon product by reducing carbon oxides with a reducing agent in the presence of a catalyst. The carbon oxides are typically either carbon monoxide or carbon dioxide. The reducing agent is typically either a hydrocarbon gas or hydrogen. The desired morphology of the solid carbon product may be controlled by the specific catalysts, reaction conditions and optional additives used in the reduction reaction. The process is conducted at a low pressure and uses a cryogenic chilling process to remove water from a feed stream.

While all of the techniques described can be used to form carbon nanotubes, none of the processes provide a practical method for bulk or industrial scale production. Specifically, the amounts formed and the process efficiencies are both low.

SUMMARY

An embodiment discussed herein provides a system for the production of a carbon allotrope. The system includes a reactor configured to use a catalyst to form the carbon allotrope from a feed stock in a Bosch reaction. The catalyst includes a roughened metal surface.

Another embodiment provides a method for forming a catalyst for the formation of carbon nanotubes, including creating a catalyst having a roughened metal surface.

Another embodiment provides a method for forming carbon nanotubes. The method includes forming carbon nanotubes on a catalyst in a reactor using a Bosch reaction, wherein the catalyst includes a comminuted metal surface. The carbon nanotubes are separated from a reactor effluent to form a waste stream. A feed gas, a dry waste gas stream, or both, is heated with waste heat from the waste stream. The waste stream is chilled in an ambient temperature heat exchanger to condense water vapor, forming the dry waste gas stream.

DESCRIPTION OF THE DRAWINGS

The advantages of the present techniques are better understood by referring to the following detailed description and the attached drawings, in which.

DETAILED DESCRIPTION

Figure 1:
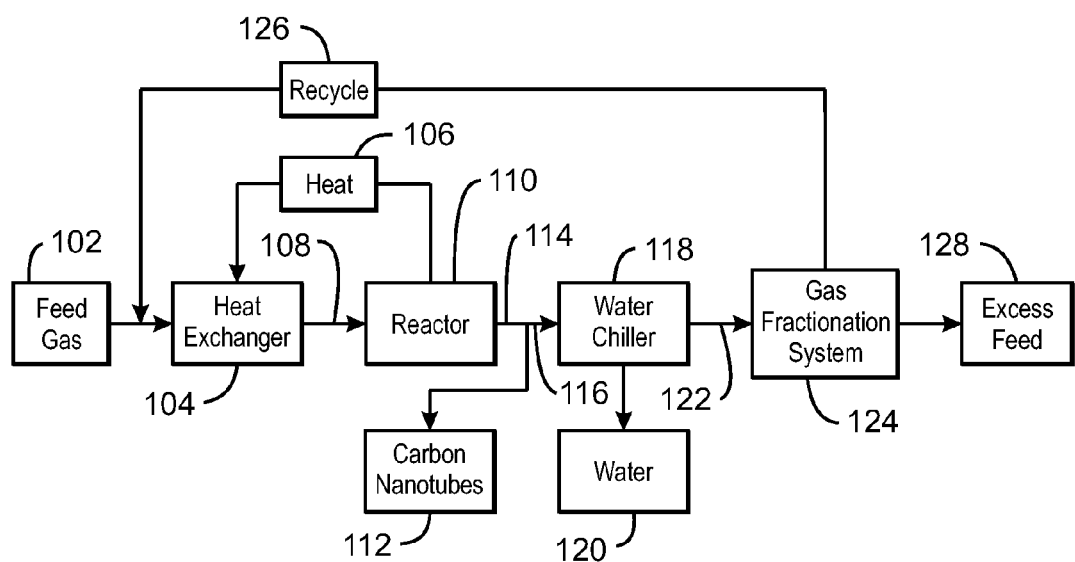
FIG. 1 is a block diagram of a reaction system that generates carbon allotropes, for example, as a by-product of a carbon dioxide sequestration reaction.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

Carbon fibers, nanofibers, and nanotubes are allotropes of carbon that have a cylindrical structure, which can be in the nanometer range. Carbon nanofibers and nanotubes are members of the fullerene structural family, which includes the spherical carbon balls termed "buckminister fullerene." The walls of the carbon nanotubes are formed from sheets of carbon in a graphene structure. As used herein, nanotubes may include single wall nanotubes and multiple wall nanotubes of any length. It can be understood that the term "carbon allotropes" as used herein and in the claims, includes all allotropes of carbon, such as carbon fibers, carbon nanofibers, and other carbon nanostructures.

A "compressor" is a device for compressing a working gas, including gas-vapor mixtures or exhaust gases, and includes pumps, compressor turbines, reciprocating compressors, piston compressors, rotary vane or screw compressors, and devices and combinations capable of compressing a working gas. In some embodiments, a particular type of compressor, such as a compressor turbine, may be preferred. A piston compressor may be used herein to include a screw compressor, rotary vane compressor, and the like.

As used herein, a "plant" is an ensemble of physical equipment in which chemical or energy products are processed or transported. In its broadest sense, the term plant is applied to any equipment that may be used to produce energy or form a chemical product. Examples of facilities include polymerization plants, carbon black plants, natural gas plants, and power plants.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in natural gas, oil, or chemical processing facilities.

As used herein, the term "natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., hydrogen sulfide), or any combination thereof. The natural gas can also contain minor amounts of contaminants such as water, nitrogen, iron sulfide, wax, crude oil, or any combination thereof. The natural gas stream may be substantially purified prior to use in embodiments, so as to remove compounds that may act as poisons.

A "low-BTU natural gas" is a gas that includes a substantial proportion of $CO_2$ as harvested from a reservoir. For example, a low BTU natural gas may include 10 mol % or higher $CO_2$ in addition to hydrocarbons and other components. In some cases, the low BTU natural gas may include mostly $CO_2$.

Overview

Embodiments described herein provide catalysts and systems and methods for making catalysts for the production of carbon allotropes, including carbon fibers, nanofibers, and nanotubes (CNTs). The production process uses feedstocks that can include, or form, mixtures of carbon oxides and hydrocarbons, such as $CO_2$ and methane, among others. In some embodiments, the feedstocks are higher in hydrocarbons, while in other embodiments, the feedstocks are higher in carbon oxides. Other feedstocks may be used, including mixtures of $H_2$, CO, $CO_2$, and other hydrocarbons. The process is conducted under high temperature and pressure conditions using a Bosch reaction and/or reverse gasification reaction, as discussed with respect to FIG. 2.

The process may be slightly exothermic, energy neutral, or slightly endothermic. Accordingly, at least a portion of the heat from the reaction can be recovered and used to heat the feed gases, providing a portion of the heat used by the process during continuous operations. As a high pressure process is used, an ambient temperature heat exchanger is sufficient for the removal of water vapor from the product stream, without using cryogenic coolers. After separation of the product and water formed during the reaction, a gas fractionation system is used to separate any remaining amounts of the limiting reagent from a waste gas mixture and recycle this reagent to the process.

As used herein, an ambient temperature heat exchanger can include water chillers, air coolers, or any other cooling system that exchanges heat with a source that is at substantially ambient temperature. It can be understood that ambient temperature is substantially the temperature of the outside air at the location of the facility, e.g., ranging from about −40° C. to about +40° C., depending on the location of the facility. Further, different types of ambient temperature heat exchangers may be used depending on current ambient temperature. For example, a facility that uses water chillers in a summer season may use air coolers in a winter season. It can be understood that an appropriate type of heat exchanger may be used at any point herein that describes the use of an ambient temperature heat exchanger. The ambient temperature heat exchangers may vary in type across the plant depending on the amount of cooling needed.

The catalysts formed in embodiments described herein can be used to produce industrial quantities of carbon products such as fullerenes, carbon nanotubes, carbon nanofibers, carbon fibers, graphite, carbon black, and graphene, among others, using carbon oxides as the primary carbon source. The balance of the possible products may be adjusted by the conditions used for the reaction, including the composition of the catalysts and the techniques used to make the catalysts, as well as reaction temperatures, pressures, feedstocks, and the like. In a reactor system, the carbon oxides are catalytically converted to solid carbon and water. The carbon oxides may be obtained from numerous sources, including the atmosphere, combustion gases, process off-gases, well gas, and other natural and industrial sources.

The present process uses two feedstocks, a carbon oxide, e.g., carbon dioxide ($CO_2$) or carbon monoxide (CO), and a reducing agent, e.g., methane ($CH_4$) or other hydrocarbons, hydrogen ($H_2$), or combinations thereof. The reducing agent may include other hydrocarbon gases, hydrogen ($H_2$), or mixtures thereof. A hydrocarbon gas can act as both an additional carbon source and as the reducing agent for the carbon oxides. The feedstock gases may be directly used in the reactor, or may be formed from other carbonaceous compounds. For example, syngas may be created as intermediate compounds in the process or may be contained in the feed. Syngas, or "synthetic gas," includes carbon monoxide (CO) and hydrogen ($H_2$) and, thus, includes both the carbon oxide and the reducing gas in a single mixture.

The systems described herein may be incorporated into power production and industrial processes for the sequestration of carbon oxides, allowing their conversion to solid carbon products. For example, the carbon oxides in the combustion or process off-gases may be separated and concentrated to become a feedstock for this process. In some cases these methods may be incorporated directly into the process flow without separation and concentration, for example as an intermediate step in a multi-stage gas turbine power station.

As used herein, an industrial scale process may provide large quantities of carbon allotropes in short periods of time. For example, the techniques used herein may provide carbon allotropes in quantities greater than about 0.5 Kg/hr, greater than about 1 Kg/hr, greater than about 2 Kg/hr, greater than about 5 Kg/hr, greater than about 10 Kg/hr, greater than about 100 Kg/hr, or greater than 1000 Kg/hr. The amounts produced depend on the scale of the equipment and the catalysts chosen.

FIG. 1 is a block diagram of a reaction system 100 that generates carbon allotropes, for example, as a by-product of a carbon dioxide sequestration reaction. The reaction system 100 is provided a feed gas 102, which, for example, can be a mixture of $CO_2$ and $CH_4$, among others. Other components may be present in the feed gas 102, such as $C_2H_6$, $C_2H_4$, oxygenates, and the like. In one embodiment, the feed gas 102 has been treated to remove these components, for example, for sale as product streams.

The feed gas 102 is passed through a heat exchanger 104 to be heated for reaction. During continuous operation, a portion of the heating is provided using heat 106 recovered from the reaction. The remaining heat for the reaction may be provided by an auxiliary heater, as described below. During start-up, the auxiliary heater is used to provide the total heat to bring the feed to the appropriate reaction temperature, e.g., about 500-1000° C. (about 930-1832° F.). In one embodiment, the feed is heated to between about 500° C. (about 932° F.) to about 550° C. (about 1022° F.). In another embodiment, the feed is heated to between about 700° C. (about 1292° F.) to about 750° C. (about 1382° F.). In another embodiment, the feed is heated to between about 800° C. (about 1472° F.) to about 850° C. (about 1562° F.). In one embodiment, the feed is heated to about 600° C. (around 1112° F.). The heated feed gas 108 is fed to a reactor 110.

In the reactor 110, a catalyst reacts with a portion of the heated feed gas 108 to form carbon allotropes, such as carbon nanotubes 112, using the Bosch reaction. As described in more detail below, the reactor 110 can be a fluidized bed reactor that uses any number of different catalysts. The catalysts may have any number of compositions, including metals and non-active materials, as discussed in more detail with respect to FIGS. 3 and 4. Further, in various embodiments, the catalyst may have roughened metal surfaces including, for example, acid treated surfaces or comminuted surfaces, among others.

The carbon nanotubes 112 are separated from the flow stream 114 out of the reactor 110, leaving a waste gas stream 116 containing excess reagents and water vapor. At least a portion of the heat from the flow stream 114 is used to form the heated feed gas 108 prior to the flow stream 114 entering the chiller as waste gas stream 116.

The waste gas stream 116 is passed through an ambient temperature heat exchanger, such as water chiller 118, which condenses out the water 120. The resulting dry waste gas stream 122 is used as a feed stream for a gas fractionation system 124. It can be understood that a dry waste gas stream 122, as used herein, has the bulk of the water removed, but may still have small amounts of water vapor. For example, the dew point of a dry waste gas stream 122 may be greater than about −5° C., greater than about 0° C., greater than about 5° C., greater than about 10° C., greater than about 20° C., or higher. A dryer may be used to lower the dewpoint, for example, to about −50° C., about −70° C., or lower, prior to gas fractionation.

The gas fractionation system 124 removes a portion of the reagent having the lower concentration in the feed gas 102 and recycles it to the process, for example, by blending a recycle stream 126 with the feed gas 102. The higher concentration gas in the feed gas 102 can be disposed of as excess feed 128, for example, by sales to downstream users. As an example, if $CO_2$ is the highest concentration gas in a blend with $CH_4$, the gas fractionation system 124 can be used to remove $CH_4$ remaining in the waste gas stream, and send it back into the process as recycle 126. The process functions as an equilibrium reaction between the reagents and solid carbon, as discussed further with respect to FIG. 2.

The gas fractionation system 124 may not be needed when hydrocarbons, such as $CH_4$, are in excess, as much of the carbon oxides, such as $CO_2$, may be consumed in the reaction. Thus, the excess feed 128 that contains the $CH_4$, and which may also contain $H_2$, CO, and other gases, may be used to generate power in a power plant without further purification or gas separation. Further, a portion of this excess feed 128 may be recycled without further treatment or fractionation.

Figure 2:
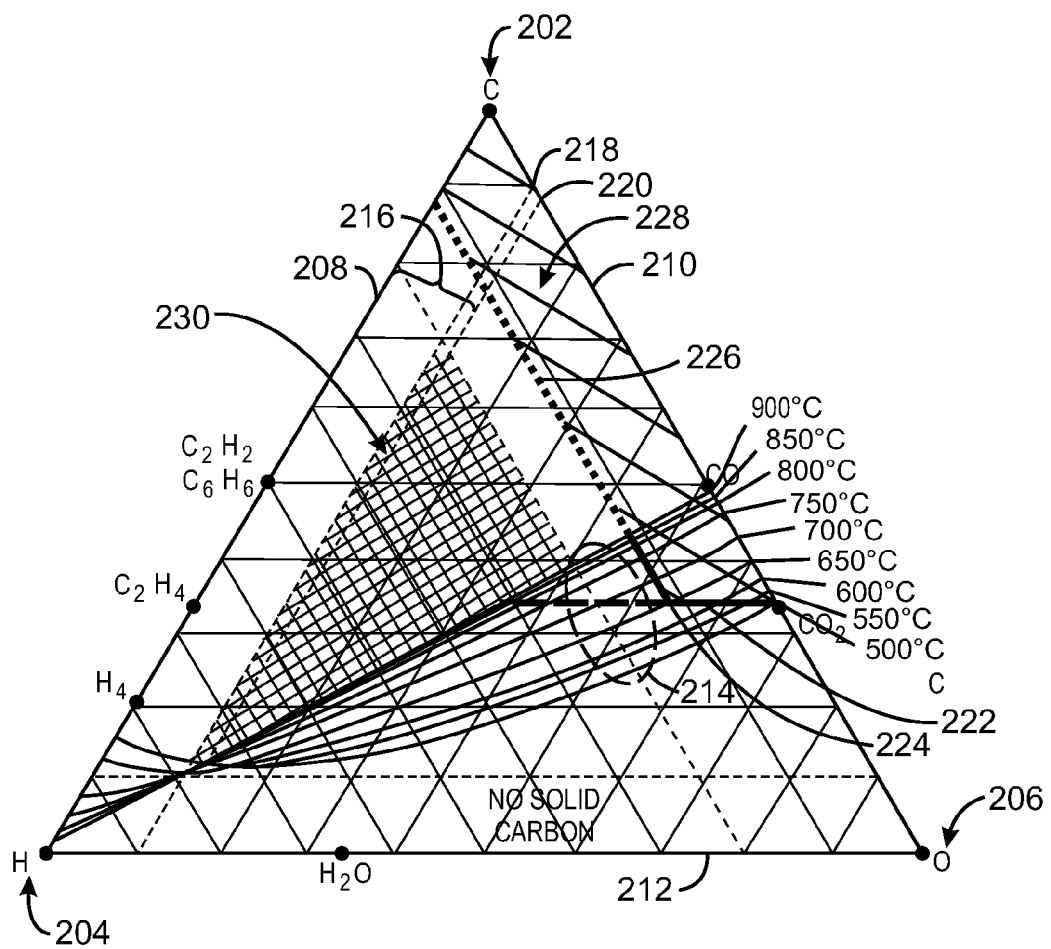
FIG. 2 is an equilibrium diagram that identifies conditions under which a solid carbon product will form.

FIG. 2 is an equilibrium diagram that identifies conditions under which a solid carbon product will form. This diagram is a triangular diagram 200 with the elements, C 202, H 204, and O 206, at the apexes of the triangle. As one moves from any location towards an apex the molar ratio of the element, C 202, H 204, and O 206, increases. In this way all of the possible compositions of the three elements can be mapped onto the triangular diagram 200.

Any chemical compound, or mixture, with any two or all these three elements can be mapped onto the triangular diagram 200 as indicated by the exemplary points marked. Some of the chemical compounds include hydrocarbons such as alkanes, alkenes and alkynes as well as many other types of hydrocarbons. The hydrocarbons are located on the C—H edge 208 connecting C 202 and H 204. Chemical compounds that include only the elements C 202 and O 206, including carbon monoxide (CO) and carbon dioxide ($CO_2$), occur along the C—O edge 210 connecting C 202 and O 206. Chemical compounds that include only the elements H 204 and O 206, such as water ($H_2O$), occur along the H—O edge 212 connecting H 204 and O 206.

In the central region of the triangular diagram 200 are chemical compounds and mixtures that have all three elements, C 202, H 204, and O 206. For example, these chemical compounds may include a very large number of individual components, such as alcohols, aldehydes, ethers, and materials with more complex structures, such as carbohydrates. Further, mixtures of compounds such as hydrogen, carbon oxides, and hydrocarbons may also be present.

Some of the first experiments to form fullerenes, $C_{60}$ and $C_{70}$, as well as carbon nanotubes (CNTs) were performed by laser ablation of a carbon electrode, capturing the carbon material in a mass spectrometer. The curves 214 shown in FIG. 2 show the limit of carbon production at various temperatures. These curves 214 were determined by performing a stoichiometrically constrained Gibbs minimization, which minimizes the Gibbs free energy of the resulting compounds based on the constraint that the amount of carbon, oxygen and hydrogen are to be the same both before and after the reaction. The point where solid carbon formation occurs for the first time was noted as the composition was moved from a first composition point to a second composition point on the triangular diagram 200.

In thermodynamic terms, the curves 214 identify the points where the activity of carbon is about 1.0. Above a carbon activity of about 1.0, solid carbon forms, in the center region, while below the carbon activity of about 1.0, no solid carbon forms. The triangle diagram 200 is useful for identifying the conditions where carbon allotropes, such as carbon nanotubes (CNTs) can possibly be produced, as well as determining compounds and mixtures that can be used for their production.

At the temperatures indicated in FIG. 2, most hydrocarbons, and other organic compounds, undergo thermal decomposition to produce small, thermodynamically stable, gas molecules, such as CO, $CO_2$, $CH_4$, $H_2O$, $H_2$, and the like. Under certain reaction conditions, these small gas molecules can react to produce carbon allotropes. In some cases, the carbon allotropes will be in the form of CNTs. Both single walled and multi-walled CNTs of various dimensions and chiralities can be made in these ways.

Reaction Pathways for the Formation of Carbon Allotropes

Hydrocarbons undergo thermal decomposition in two ways, depending upon the concentration of oxygen. Without oxygen being present, large hydrocarbon molecules will thermally decompose into smaller hydrocarbons, such as methane, ethane, propane, and hydrogen. These small hydrocarbons will further decompose to carbon and more hydrogen giving an overall reaction as shown in Rxn. 1. This reaction, termed a pyrolysis reaction, occurs along the C—H edge 208.

Rxn. 1

A representative case is the thermal decomposition of methane, shown in Rxn. 2.

Rxn. 2

In the presence of a low amount of oxygen, hydrocarbons will react to form carbon monoxide and carbon dioxide and water as well as carbon allotropes and hydrogen according to the reaction shown in Rxn. 3. This reaction is termed the Bosch reaction, and occurs in the center region of the triangular diagram 200.

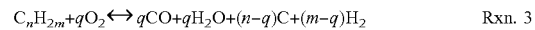

Rxn. 3

The ratio of CO to $H_2O$ after reaction may differ depending upon the temperature of the system. Further, depending upon the amount of oxygen there may be some carbon dioxide in the product gases. Any carbon monoxide or carbon dioxide produced may react to form carbon allotropes at the high temperature conditions. Higher concentrations of $O_2$ typically results in higher temperatures, due to combustion, resulting in the production of more CO and $CO_2$ and less solid carbon and hydrogen. Thus, the reaction system must restrict the amount of oxygen present in the system in order to produce larger amounts of carbon allotropes.

Organic compounds that include small amounts of oxygen in them may also be useful in the production of carbon allotropes. These compounds thermally decompose to form small, thermodynamically stable, gas molecules which can further react on a catalyst surface to produce carbon allotropes and water according to the overall reaction shown in Rxn. 4, which is another example of the Bosch reaction.

$$C_nH_{2m}O_q \leftrightarrow nC + qH_2O + (m-q)H_2 \qquad \text{Rxn. 4}$$

Any carbon monoxide or carbon dioxide produced has a tendency to react to carbon at these high-temperature conditions, adding to the overall productivity. These reactions form the simplest embodiments of the Bosch reaction, shown in Rxn. 5.

$$CO_2 + 2H_2 \leftrightarrow C + 2H_2O \qquad \text{Rxn. 5}$$

The Bosch reaction can be mechanistically written as two separate reactions in which CO is produced as an intermediate, as shown in Rxns. 6 and 7.

$$CO_2 + H_2 \leftrightarrow C + H_2O \qquad \text{Rxn. 6}$$

$$CO + H_2 \leftrightarrow C + H_2O \qquad \text{Rxn. 7}$$

The first, Rxn. 6, is fast and tends toward equilibrium. The second, Rxn. 7, is slow. Another reaction that can produce carbon allotropes is the Boudouard reaction that is shown in Rxn. 8. The Boudouard reaction takes place on the C—O edge 210, and produces carbon allotropes and carbon dioxide from carbon monoxide.

$$2CO \leftrightarrow C + CO_2 \qquad \text{Rxn. 8}$$

In addition to forming small molecules directly in the reactor, a number of other approaches may be used to provide the reactants to form the carbon allotropes. For example, the steam reforming of hydrocarbons and other organic chemicals may be used. In these reactions, shown in Rxns. 9 and 10, a mixture of CO and hydrogen, called syngas, is formed.

$$C_nH_{2m} + nH_2O \leftrightarrow nCO + (m+n)H_2 \qquad \text{Rxn. 9}$$

$$C_nH_{2m}O_q + (n-q)H_2O \leftrightarrow nCO + (m+n-q)H_2 \qquad \text{Rxn. 10}$$

At the reaction temperatures shown in the triangular diagram 200, the syngas forms carbon allotropes via the second step of the Bosch reaction mechanism, shown in Rxn. 7.

As is apparent in the reactions shown above, there is a multitude of starting points for the production of carbon allotropes, such as CNTs. However, the reactions can be simplified by focusing on the conversion of the feedstock compounds into a mixture of small, thermodynamically stable, gases. These gases can then react to form carbon allotropes in the presence of a catalyst. This simplification can be performed by noting that a given hydrocarbon reacting with oxygen or with steam will be converted to carbon monoxide, carbon dioxide, water vapor, and hydrogen. Similarly, a given oxygenate reacting with itself, or with oxygen or steam, will also be converted to carbon monoxide, carbon dioxide, water vapor, and hydrogen. The ultimate mixture of small thermodynamically stable gases can be determined by performing equilibrium calculations on the reactions described above.

The gas mixture can then be converted to carbon allotropes in the Boudouard Reaction shown in Rxn. 8, step two of the Bosch reaction shown in Rxn. 7, the methane pyrolysis reaction shown in Rxn. 2, or some combinations of these. As all of these reactions produce carbon allotropes, they may be used to predict the carbon activity as a function of the composition of carbon monoxide, carbon dioxide, hydrogen, water vapor, methane, etc. which are produced by some previous thermal decomposition reaction.

Oxidation Poisoning of Metal Catalysts

Another aspect of the catalytic reaction to produce carbon allotropes is that certain gas compositions and temperatures will oxidize the metal catalyst used in the reaction, rendering it ineffective for further catalytic reaction, as shown in Rxn. 11. The point where oxygen causes a metal or alloy to oxidize depends upon its properties. For elemental metals this is determined by the Gibbs free energy of formation of the oxide.

$$xM + yO_2 \leftrightarrow M_xO_{2y} \qquad \text{Rxn. 11}$$

If a catalyst includes iron, there are various oxides that may be formed. The most common include Wüstite (FeO), magnetite ($Fe_3O_4$), and hematite ($Fe_2O_3$). Wüstite is thermodynamically favored at the temperatures and pressures shown in FIG. 2 and forms by the reaction shown in Rxn. 12.

$$Fe + \tfrac{1}{2}O_2 \leftrightarrow FeO \qquad \text{Rxn. 12}$$

An equilibrium constant, $K_{FeO}$, for Rxn 12 can be determined by the formula shown in Eqn. 4.

$$K_{FeO} = \exp[-\Delta G_{FeO}/(R_g T)] = [P_{O_2}/P_T]^{-1/2} \qquad \text{Eqn. 4}$$

In Eqn. 4, $\Delta G_{FEO}$ is the Gibbs free energy of iron oxidation to Wüstite which is a function of temperature, $R_g$ is the gas constant, T is the absolute temperature, $P_{O2}$ is the partial pressure of oxygen ($O_2$), and $P_T$ is the total pressure of the system. The ratio, $P_{O2}/P_T$, is simply the mole fraction of $O_2$ in the system. Using this equation, the partial pressure of oxygen that will initiate the oxidation of iron at any temperature can be identified.

The partial pressure of oxygen can be obtained from one of the fast reaction equilibria presented in Eqns. 5 and 6.

$$H_2O \leftrightarrow H_2 + 1/2\, O_2,\ P_{O2} = P_T \sqrt{K_{H2O} \frac{Y_{H2O}}{Y_{H2}}} \qquad \text{Eqn. 5}$$

$$CO_2 \leftrightarrow CO + 1/2\, O_2,\ P_{O2} = P_T \sqrt{K_{CO2} \frac{Y_{CO2}}{Y_{CO}}} \qquad \text{Eqn. 6}$$

In these equilibria calculations, $K_i$ is the equilibrium constant, a function of temperature, for the decomposition of gas i. As shown by Eqns. 5 and 6, the partial pressure of oxygen is controlled by either the mole fraction ratio of water vapor to hydrogen or the mole fraction ratio of carbon dioxide to carbon monoxide at a given temperature.

As shown in Eqns. 1-6, the mole fraction ratios are important in the determination of the partial pressure of oxygen and in the definition of carbon activity for the Boudouard and Bosch reaction mechanisms. For example, the mole fraction ratio sets both the carbon activity and the partial pressure of oxygen, so that there will be a given activity of carbon that will initiate the oxidation of the metal catalyst.

As the pyrolysis reactions are endothermic, their zone of influence is in near the H 204 apex of the triangle diagram 200, where the temperature lines curve, inverting the temperature sequence as the amount of carbon in the system increases. As a result, a zone 216 near the C—H edge 208 may be delineated in the triangle near the H apex where pyrolysis reactions dominate over the Bosch reactions. As the transition point changes as the temperature of the system changes, two lines 218 and 220 can be used to indicate the edge of the zone 216, depending on the temperature. The first line 218 delineates the zone 216 at about 1173.45 K (about 900° C.), while the second line 220 delineates the zone 216 at about 973.15 K (about 700° C.). The pyrolysis reactions dominate over the Bosch reactions in the zone between either of the lines 218 or 220 and the C—H edge 208.

Further, from the Ac produced by both the Bosch second step and the Boudouard reactions, a zone near the C—O edge 210 can be identified at which there is an equal probability for the first solid carbon allotropes to be produced by either reaction, based on the thermodynamics. One edge of this zone can be delineated by a first line 222 in the triangle diagram 200. Further, as discussed above, there is a point at which the second step of the Bosch reaction generates sufficient water to cause the partial pressure of oxygen to be sufficiently high that the iron catalyst will oxidize to Wüstite. At this point 224 the first line 222 becomes dotted and a second line 226, at a fixed hydrogen (H) content of about 0.14 for FeO, limits the Boudouard zone at about 1 atm system pressure. The Boudouard zone 228 dominates over the Bosch reaction at reaction conditions above and to the right of the first line 222 and to the right of the second line 222 (FeO oxidation).

CONCLUSION

The calculations discussed with respect to FIG. 2 identify carbon activity as the driving force for the production of carbon allotropes, such as CNTs. Thus, various reaction mixtures in the C—H—O system can be reduced to a prediction of the carbon activity using three carbon forming reactions that are applicable on the C—H edge 208, C—O edge 210, and the central portion of the triangular diagram of the C—H—O system. Carbon activities larger than about 1.0 produces carbon by each of the three carbon forming reactions. In some cases the carbon activity is a predictor of the transformation of iron to Wüstite, FeO. In these cases, the carbon activity where iron oxidizes will limit the carbon activity range where carbon can form to values larger than about 1.0. In the case of the Bosch second step reaction with equimolar $CO:H_2$ feed at about 973.15 K (about 700° C.) the carbon activity is limited to values larger than about 35 for example.

Further, the calculations show clearly delineated zones where pyrolysis (zone 216) and Boudouard reactions (zone 228) dominate on the C—H edge 208 and C—O edge 210, respectively, of the triangle diagram 200. This also shows that experimental conditions in the central part of the triangular diagram of the C—H—O system define a Bosch reaction region 230 that provides the largest reactor conversion resulting in faster production and higher yields than reactions on the C—H edge 208 or C—O edge 210 of the triangular diagram 200. In this region, the concentration of the carbon is set by the Ac, and is greater than about 10%. Further, the oxygen content is greater than about 10%, and the hydrogen concentration is greater than about 20%.

Figure 3:
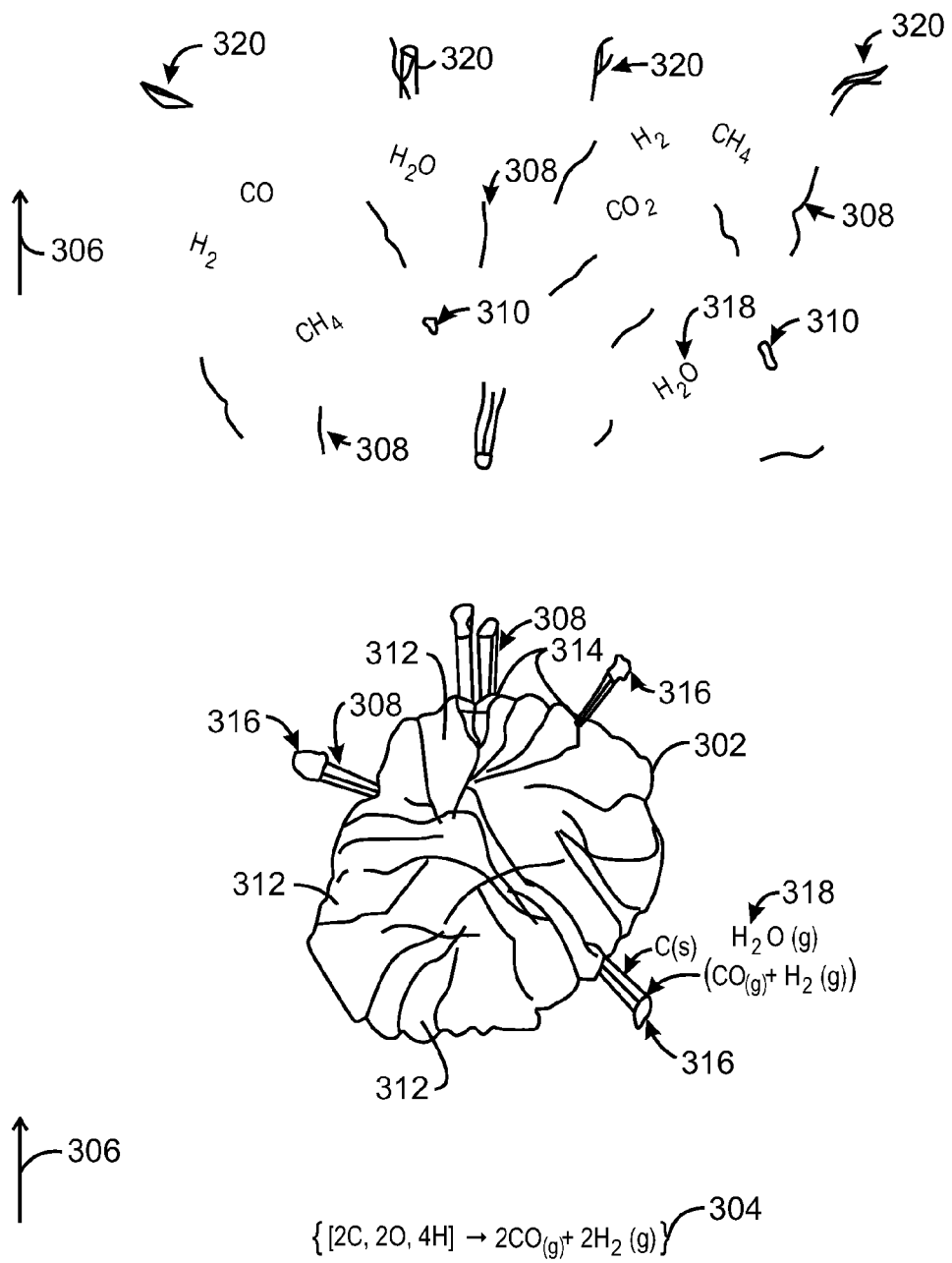
FIG. 3 is a schematic of a catalytic reaction for the formation of carbon allotropes, such as carbon nanotubes (CNTs), on a catalyst particle.

FIG. 3 is a schematic of a catalytic reaction 300 for the formation of carbon allotropes, such as carbon nanotubes (CNTs), on a catalyst bead 302. An initial reaction 304 in a portion of the hot gas feed stream 306, for example, in a $CO_2$ and $CH_4$ mixture, results in the formation of CO and $H_2$ in stoichiometric amounts. Excess amounts of the source gases 306 continue to flow through the reactor, helping to fluidize the bed and carrying away CNTs 308 and catalyst particles 310.

The reactions that form the CNTs 308 take place on the catalyst bead 302 or a catalyst particle 310. The size of the CNTs 308, and the type of CNTs 308, e.g., single wall or multiwall CNTs 308, may be controlled by the size of the grains 312. Without being limited by theory, a nucleus of iron atoms of sufficient size at the grain boundary 314 may form a nucleating point for the growth of the carbon products on the catalyst bead 302, although reactions may take place at other points besides the grain boundary 314. Other parameters may be used to affect the morphology of the final product as well, including reaction temperature, pressure, and feed gas flow rates. The CO and $H_2$ react on the catalyst surface, for example, at grain boundaries 314, lifting active catalyst particles 316 off the catalyst bead 302, and forming $H_2O$ 318 and the solid carbon of the CNTs 308. The CNTs 308 break off from the catalyst particle 302 and from the catalyst particle 310. Larger catalyst particles 310 can be captured and returned to the reactor, for example, by a catalyst separator as discussed with respect to FIG. 4, while very fine catalyst particles 310 will be carried out with the CNTs 308.

The final product will include about 70 mol % solid carbon and about 15 mol % metal, about 80 mol % solid carbon and about 10 mol % metal, about 90 mol % solid carbon and about 7 mol % metal, or about 95 mol % solid carbon and about 5 mol % metal. The CNTs 308 will often agglomerate to form clusters 320, which are the common form of the final product. Some amount of the CO and $H_2$ passes through the reactor without reacting and are contaminants in the reactor effluent streams.

As the reaction proceeds, the catalyst bead 302 and catalyst particles 310 are degraded and finally consumed. Accordingly, the reaction can be described as a metal dusting reaction. In some embodiments, metal surfaces are protected from attack by a protective lining such as ceramic or gold, since the metal surfaces in contact with the reaction conditions would not only degrade, but may also result in the formation of poorer quality products.

The catalyst bead 302 can include any number of metals from different IUPAC Groups on the periodic table, such as Group 10 (e.g., nickel), Group 8 (e.g., iron or ruthenium), Group 9 (e.g., cobalt), or Group 6 (e.g., chromium or molybdenum), among others. Other metals that may be present include Group 7 metals (e.g., manganese), or Group 5 metals (e.g., cobalt), among others. It can be understood that the metals listed above are merely exemplary of the Groups mentioned and other metals from those Groups may be included. However, the catalytic sites on the catalyst beads 302 may be principally composed of iron atoms, for example, having a mole ratio of iron atoms of greater than about 50%, greater than about 60%, greater than about 70%, greater than about 80%, or greater than about 90%. In one embodiment, the catalyst bead 302 includes metal shot, for example, about 25-50 mesh metal beads that are used for shot blasting. In various embodiments, the catalyst includes particles between about 25 μm and 600 μm in size. In many embodiments, the catalyst comprises particles between about 250 and 589 micrometers in size. In some embodiments, the catalyst comprises particles between about 450 and 550 micrometers in size.

In one embodiment, the catalyst may include stainless steel. The nickel in the stainless steel may lower the amount of passivation that occurs as a result of the oxidation of the metal, providing higher activity during the process. For example, in a stainless steel particle used for a catalyst, the nickel content may be about 1%, about 3%, about 5%, or greater. Although greater amounts of nickel may promote lower passivation of the catalyst particle, higher amounts of nickel may also decrease the catalyst activity. Similarly, the catalyst particles may also include chromium. For example, the chromium content may be about 0%, 0.5%, 1%, or higher. As for the nickel, higher amounts of chromium may lower activity. The catalyst does not have to be a metal or metal alloy, but may include other materials. For example, the catalyst may be an iron oxide, such as hematite, magnetite, or Wüstite, or any combinations thereof. Further, the catalyst can be iron carbide or other iron compounds.

Forming Catalyst Particles

FIGS. 4A-4D provide examples of techniques for making catalyst particles having a roughened metal surface that can be used to produce carbon allotropes, such as carbon nanotubes. For example, a catalyst can be formed by cold working a metal to expose a roughened metal surface, as discussed with respect to FIG. 4A.

Figure 4A:
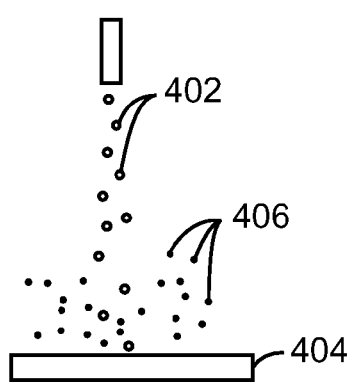
FIG. 4A is a schematic showing the generation of catalyst particles by the comminution of metal surfaces.

FIG. 4A is a schematic showing the generation of catalyst particles by the comminution of metal surfaces. In this example, metal beads 402 are fired at a hard surface 404 at high velocities in a shot peening process. The impact of the metal beads 402 with the surface 404 fragments the metal beads 402, generating metal particles 406, which can be captured and used as the catalyst particles. The hard surface 404 may also be a metal, further increasing the generation of particles from the impacts.

Other techniques for comminution of metals may also be used to generate the catalyst. For example, metal fragments can be formed by grinding a metal. In another example, metal shavings, and metal fibers, such as steel wool, can be formed by scraping metal from a surface. Other techniques for generating roughened, or stressed, metal surfaces can also be used. For example, the catalyst particles may be formed by cryogenically shattering a metal. Droplets of a molten metal may be dropped into a water quench forming roughened particles.

Figure 4B:
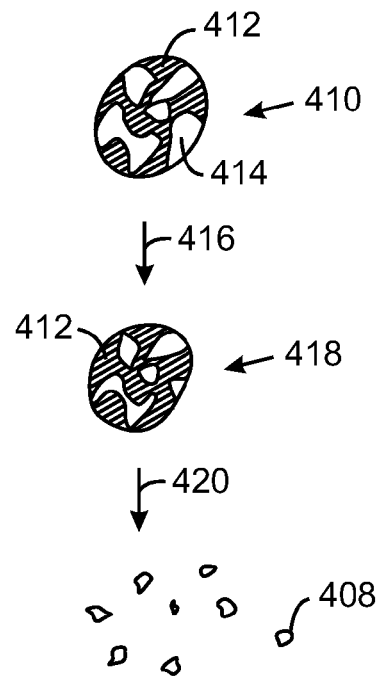
FIG. 4B is schematic showing the generation of catalyst particles using a Rainey process.

FIG. 4B is schematic showing the generation of catalyst particles 408 using a Rainey process. In this example, an alloy 410 of a catalytic metal 412, such as iron, steel, or other alloys, is formed with aluminum 414. The aluminum 414 is etched away using a concentrated solution of sodium hydroxide, as indicated by an arrow 416. The etching forms a porous structure 418 of the catalytic metal 412. This may directly provide the catalyst particles 408, for example, if the catalytic metal 412 was in lower concentration than the aluminum. Alternatively, the porous structure 418 may be shattered to form the catalyst particles 408, as indicated by an arrow 420. Further, the catalyst particles 408 may be acid treated to enhance activity.

Figure 4C:
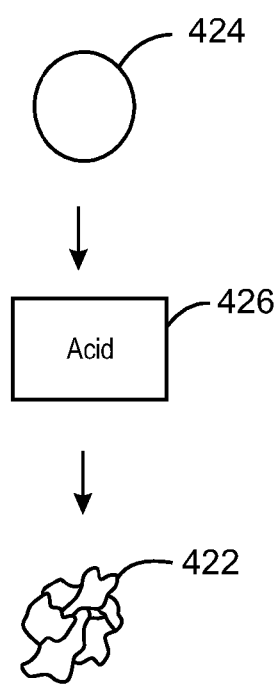
FIG. 4C is a schematic showing the generation of catalyst particles by acid treatment.

Chemical techniques for forming the roughened surface may also be used. FIG. 4C is a schematic showing the generation of catalyst particles 422 by acid treatment. The acid treatment is implemented by taking a metal particle 424, such as a steel bead, a catalyst particle 406 or 408, and the like, and exposing the metal particle 424 to an acid 426. The acid 426 is allowed to etch part of the surface of the metal particle 424, but is stopped before dissolution occurs, forming an acid etched catalyst particle 422.

Figure 4D:
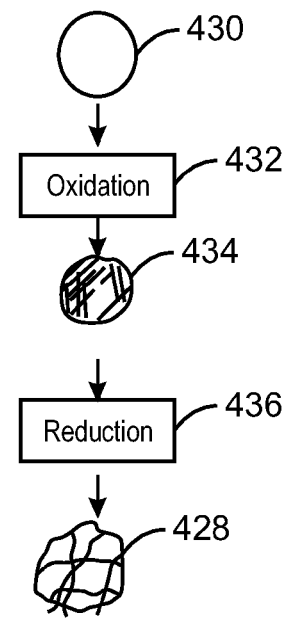
FIG. 4D is a schematic of a technique for generating catalyst particles by an oxidation/reduction process.

FIG. 4D is a schematic of a technique for generating catalyst particles 428 by an oxidation/reduction process. In this process, the metal surface of a particle 430 may be treated in an oxidation process 432, for example, by exposure to oxygen, to form a partially oxidized particle 434. The partially oxidized particle 434 may then be treated in a reduction process 436, for example, by exposure to hydrogen, to remove the oxidation layer, forming a roughened surface on the catalyst particle 428.

These techniques may be used individually, or may be combined to increase the activity of the catalyst. For example, the catalyst particles 408 generated by the Rainey process in FIG. 4B may be subjected to the acid treatment discussed with respect to FIG. 4C, or to the oxidation/reduction process discussed with respect to FIG. 4D.

Reactor Systems

Figure 5:
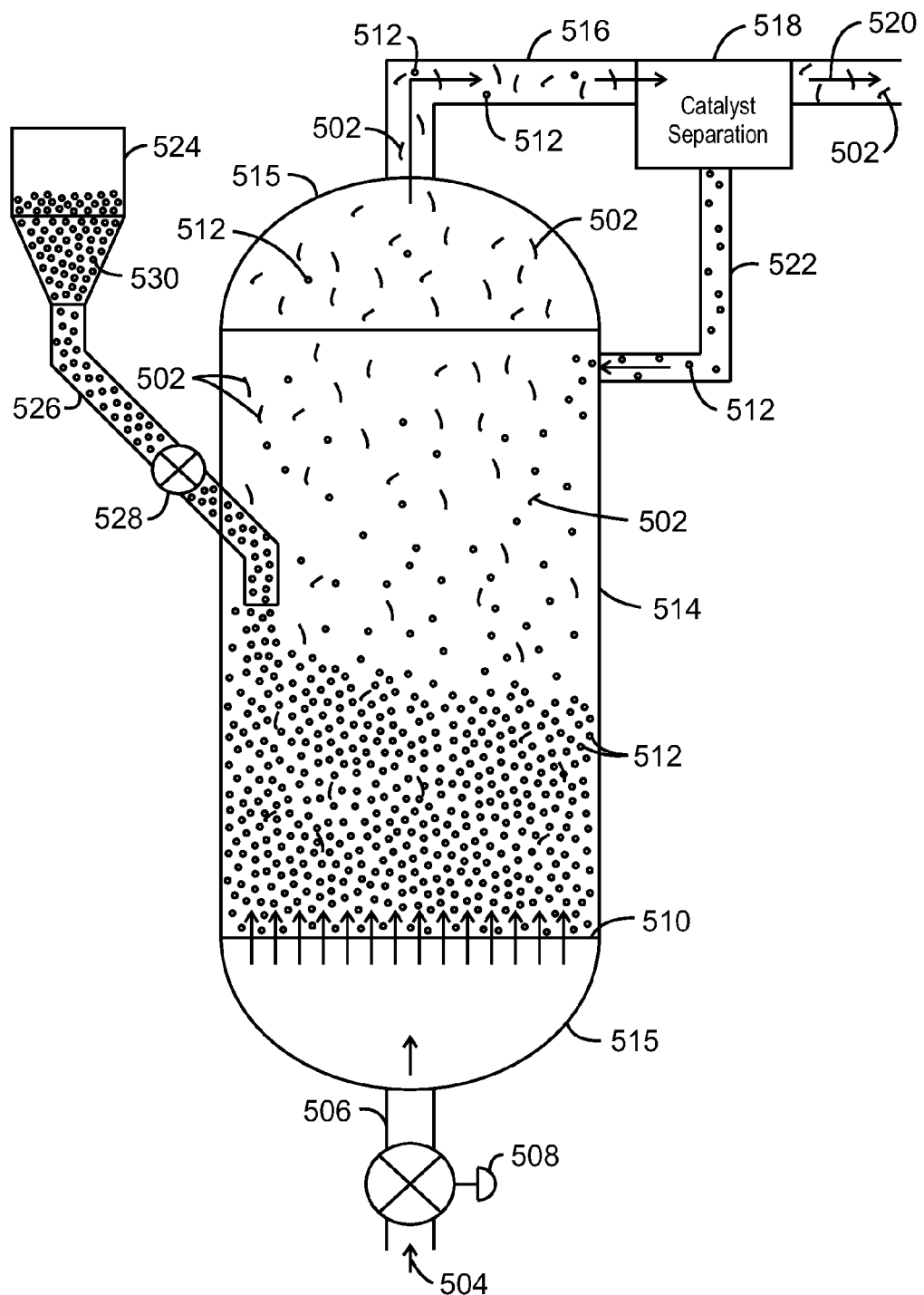
FIG. 5 is a drawing of a fluidized bed reactor for forming carbon allotropes, such as carbon nanotubes.

FIG. 5 is a drawing of a fluidized bed reactor 500 for forming carbon allotropes, such as carbon nanotubes 502. A hot gas feed stream 504 is fed through a line 506 into the bottom of the fluidized bed reactor 500. A control valve 508 may be used to regulate the flow of the hot gas feed stream 504 into the reactor. The hot gas feed stream 504 flows through a distributor plate 510 and will fluidize a bed of catalyst particles 512 held in place by the reactor walls 514. As used herein, "fluidize" means that the catalyst particles 512 will flow around each other to let gas bubbles through, providing a fluid-like flow behavior.

The catalyst particles 512 are not limited to active metal particles, but may include mixtures of active metal particles and inactive particles. The inactive particles may include alumina, cerium oxides, titania, zirconia, or $Cr_2O_3$, or any combinations thereof. The inactive particles may slow the formation rate for the carbon allotropes, enhancing the formation of desirable carbon allotropes, such as carbon nanotubes, while decreasing the amounts of less desirable carbon allotropes, such as amorphous carbon. Further, the inactive particles may abrade the active metal particles during the reaction, exposing fresh surfaces. The ratios of active to inactive particles may be about 5:1, about 4:1, about 3:1, about 2:1, about 1:1, about 1:2, about 1:3, or at any number of other ratios. The determination of the ratio between the active and inactive particles will be made experimentally for the particular catalyst, inactive particles, and feedstocks used. The measurement can be based on the amount of carbon nanotubes formed in the reaction.

The fluidized bed reactor 500 may use any number of particle sizes, changing the dynamics of the fluidization. For example, the catalyst particles 512 may be in a Geldhart class A size range, e.g., from about 20 to about 100 μm, providing a bubbling fluidization often associated with a powder catalyst. Further, the catalyst particles 512 may be in a Geldhart class B size range, e.g., from about 40 to about 500 μm, which may also provide a bubbling fluidization. In some embodiments, the catalyst particles 512 may be in a Geldart class D size range, e.g., above about 500 μm, providing a spouting bed fluidization.

As discussed herein, the reaction conditions are very harsh to any exposed metal surface, as the metal surface will perform as a catalyst for the reaction. Thus, the reaction will result in the slow degradation of an exposed metal surface. Accordingly, the interior surface of the reactor, including the reactor walls 514 and heads 515, as well as the distributor plate 510, and other parts, can be made of a protective material, such as ceramic or gold, to protect the surfaces.

As the hot gas feed stream 504 flows through the fluidized bed of catalyst particles 512, CNTs 502, and other carbon allotropes, will form from the catalyst particles 512. The flowing hot gas feed stream 504 carries the CNTs 502, and other carbon allotropes, into an overhead line 516 where they are removed from the reactor 500. Depending on the flow rate, for example, as adjusted by the control valve 508, some amount of catalyst particles 512, or smaller particles fragmented from the catalyst particles 512, may be carried into the overhead line 516. Accordingly, a catalyst separator 518 may be used to separate catalyst particles 512, and larger fragments, from a reactor effluent stream 520 and return them to the reactor 500 through a recycle line 522. Any number of configurations may be used for the catalyst separator 518, including a cyclonic separator, a settling tank, a hopper, and the like.

As the active catalyst particles 512 are continuously degraded during the reaction, some portion is carried away with the carbon nanotubes 502. Thus, more of the active catalyst particles 512 are added to the fluidized bed reactor 500 to keep a substantially even amount of catalyst particles 512 in the fluidized bed reactor 500. This can be performed from a catalyst vessel 524 that has a line 526 leading into the fluidized bed reactor 500. The line 526 can use a valve 528 to meter the flow. The particles 530 in the catalyst vessel 524 may include only active catalyst, as inactive particles in the fluidized bed reactor 500 may not be degraded during the reaction.

Figure 6:
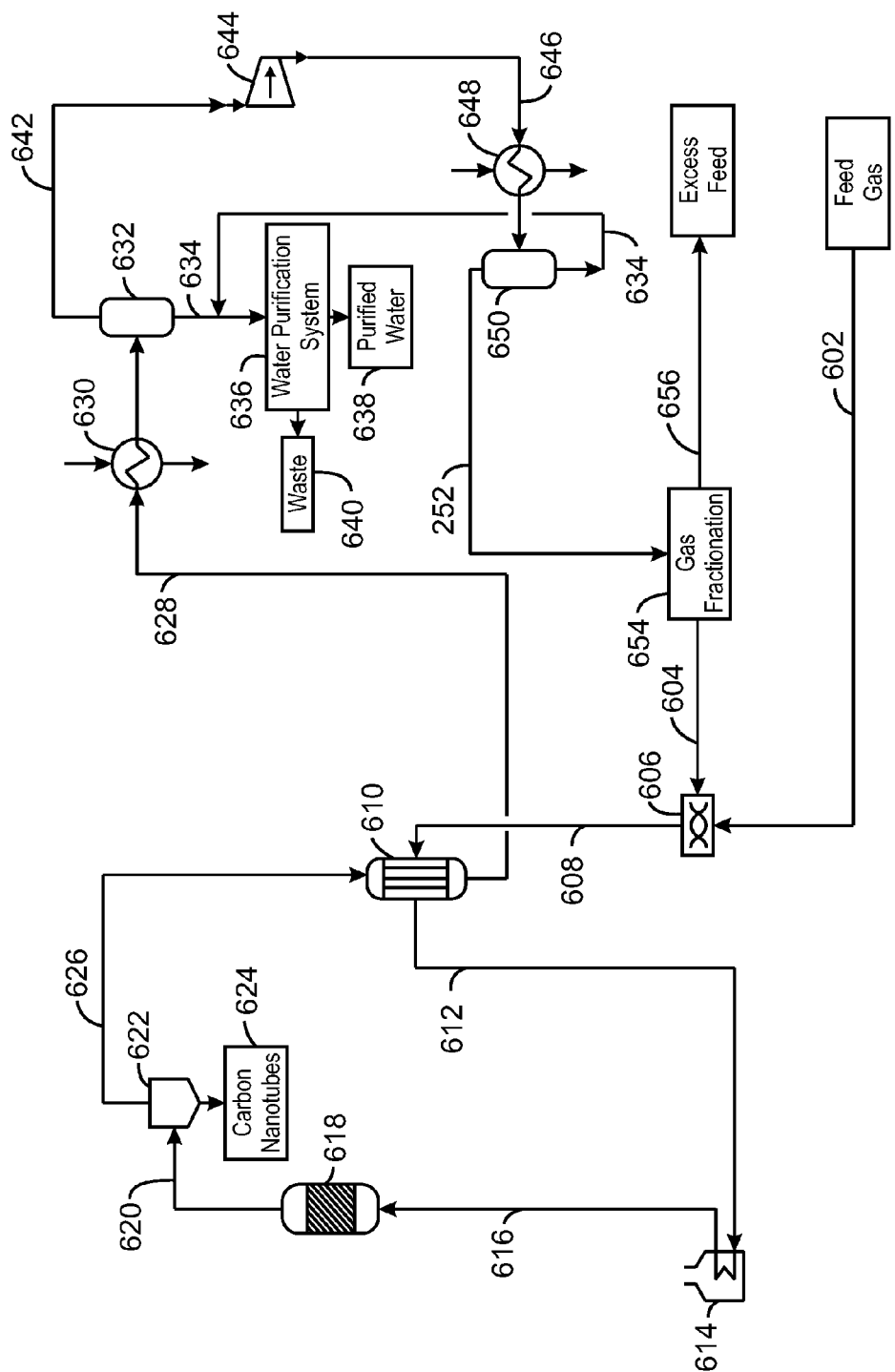
FIG. 6 is a simplified process flow diagram of a one reactor system for making carbon allotropes from a gas feed that includes carbon dioxide and methane.

FIG. 6 is a simplified process flow diagram of a one reactor system 600 for making carbon allotropes from a gas feed that includes carbon dioxide and methane. As shown, the one reactor system 600 can be used for feed gas 602 that is higher in $CO_2$ or higher in $CH_4$. In the reaction system 600, the feed gas 602 is combined with a recycle gas 604 that has an enhanced concentration of the lesser gas. The mixing can be performed using a static mixer 606.

The combined gas stream 608 is passed through a heat exchanger 610 to be heated by a reactor effluent stream. The temperature can be raised from a near ambient temperature, as defined herein, to an appropriate reaction temperature, such as about 500° C. (930° F.), about 600° C. (about 1112° F.), about 700° C. (about 1292° F.), about 800° C. (about 1472° F.), or about 900° C. (about 1652° F.) for the heated gas stream 612. This temperature may be sufficient for maintaining the reaction during continuous operations. However, part of the heat may be provided by a package heater 614, which may be especially useful for adding heat to bring the reactants up to temperature during start-up. The hot gas stream 616 is then introduced into a fluidized bed reactor 618, such as the fluidized bed reactor 500 discussed with respect to FIG. 5. The feedstocks are not limited to gaseous feedstock, but may include liquid feedstocks that are vaporized and injected directly into the fluidized bed reactor 618.

The carbon allotropes are carried from the fluidized bed reactor 618 in a reactor effluent stream 620. The reactor effluent stream 620 may be at an elevated temperature, for example, about 600° C. (about 1112° F.), about 700° C. (about 1292° F.), about 800° C. (about 1472° F.), or about 900° C. (about 1652° F.), and may be cooled by exchanging heat with the combined gas stream 608, for example, providing some or all of the heat used to heat the reactants. Either prior to or after cooling, the reactor effluent stream 620 is passed through a separation device 622, such as a cyclonic separator, to remove the carbon allotropes, such as CNTs 624. The resulting waste gas stream 626 can used to provide heat to the combined gas stream 608 in the heat exchanger 610. The carbon allotropes may also be removed in secondary separation devices (not shown) at lower temperatures than the waste gas stream 626.

After providing heat to the combined gas stream 608, the cooled waste stream 628 is passed through an ambient temperature heat exchanger 630 and then fed to a separation vessel 632. Water 634 settles in the separation vessel 632 and is removed from the bottom. The water 634 may then be fed into a water purification system 636. The water purification system 636 may produce a purified water stream 638, as well as a waste stream 640.

The water purification system 636 may be used to remove carbon allotropes from the cooled waste stream 628 through a number of separation techniques. For example, the water purification system 636 may be configured to produce a carbon oxide from the carbon allotropes within the water 634. As a further example, an air sparging process may be used to effect a separation of the carbon allotropes from the water 634.

The resulting gas stream 642 from the separation vessel 632 may be significantly cooler, for example, at about 30° C., about 38° C. (about 100° F.), or about 40° C. and at a pressure of about 2500, kilopascals (kPa), about 3000 kPa, about 3720 kPa (about 240 psia), or about 4000 kPa. In one embodiment, the gas is then dried to a low dew point in a drier (not shown). The stream enters a compressor 644 that increases the pressure of the gas stream 642, for example, to about 5000 kPa, about 6000 kPa, about 7000 kPa, about 7,240 kPa (about 1050 psia), or about 8000 kPa, forming a high pressure stream 646 which is passed through another ambient temperature heat exchanger 648. From the ambient temperature heat exchanger 648, the high pressure stream 646 is fed to a separation vessel 650 for removal of any remaining water 634, for example, if a drier has not been used. As shown in FIG. 6, the water 634 may be combined with the water 634 from the separation vessel 632 and fed into the water purification system 636.

In embodiments in which the $CO_2$ is in excess in the feed gas 602, the dried gas stream 652 can be sent to a gas fractionation system 654, which separates the excess feed 656 from the recycle gas 604. In reaction systems 600 based on a proportionate excess of $CO_2$, the excess feed 656 may primarily include $CO_2$, and the recycle gas 604 may primarily include $CH_4$. In reaction systems 600 based on a proportionate excess of $CH_4$, the excess feed 656 will not have a substantial $CO_2$ content, and a portion may be recycled without further purification, for example, replacing the gas fractionation system 654 with a manifold. In some embodiments, a portion of the excess feed 656, the recycle gas 604, or both may be used to provide a fuel gas stream, a purge gas stream, or both for use in the plant, as shown in FIG. 7.

Figure 7:
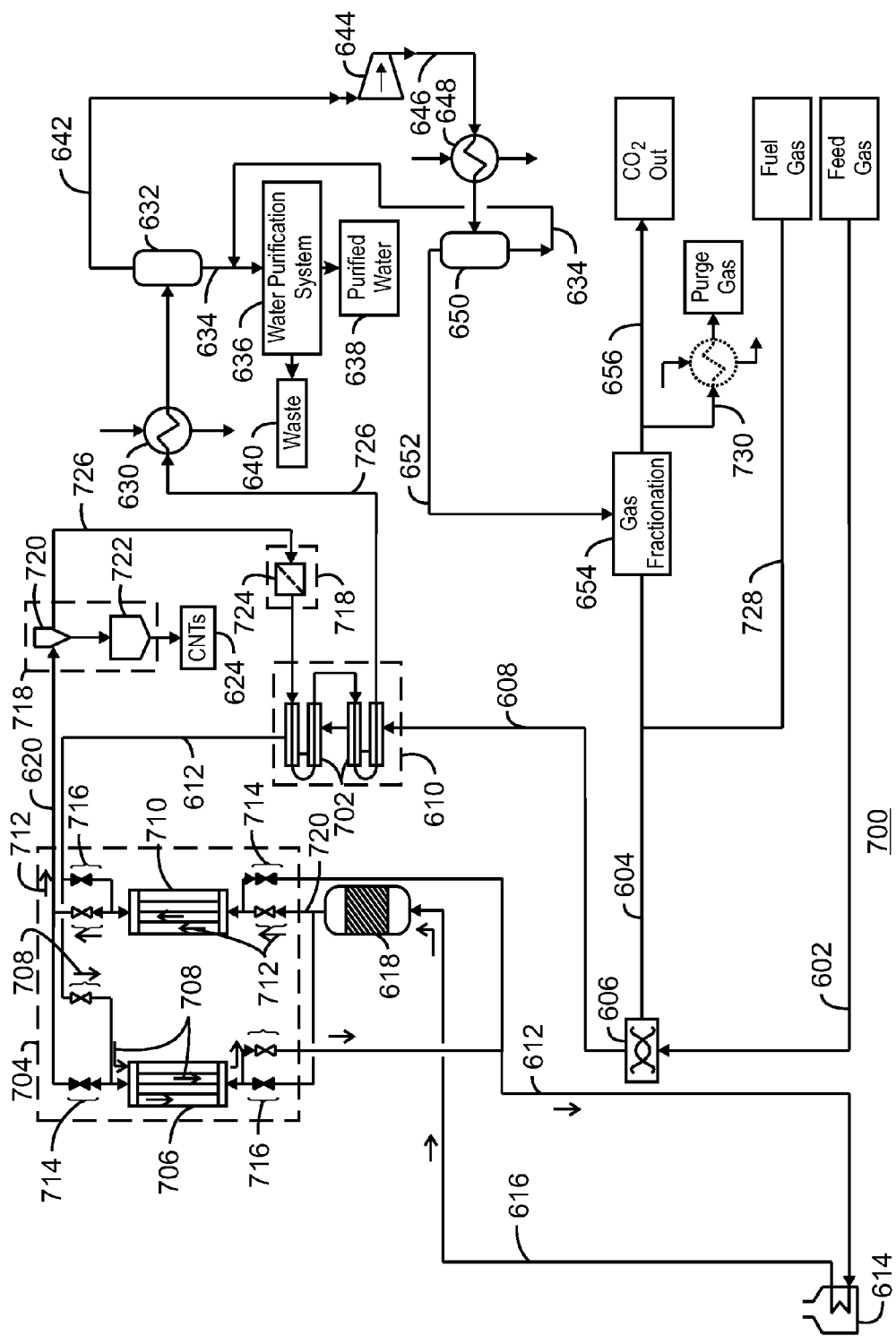
FIG. 7 is another simplified process flow diagram of a one reactor system for making CNTs from a gas feed that includes carbon dioxide and methane, in which the carbon dioxide is in excess.

FIG. 7 is another simplified process flow diagram of a one reactor system 700 for making CNTs from a gas feed that includes carbon dioxide and methane, in which the carbon dioxide is in excess. In FIG. 7, like number items are as described with respect to FIG. 6. As described with respect to FIG. 6, the feed gas 602 passes through a static mixer 606 where it is combined with a recycle gas 604, which is high in methane. The combined gas stream 608 is passed through a heat exchanger 610, for example, including multiple shell and tube heat exchangers 702. The main difference between the more detailed process flow diagram of FIG. 7 and that of FIG. 6 is the use of heat exchangers to cool the reactor effluent stream 620 prior to separating the carbon allotropes from the reactor effluent stream 620.

In this embodiment, the heated gas stream 612 is raised to a temperature of about 300° C., about 400° C., about 427° C. (about 800° F.), or about 500° C. in the heat exchanger 610 prior to flowing through a second heat exchanger 704. In the second heat exchanger 704, the heated gas stream 612 flows through a first ceramic block heat exchanger 706, as indicated by arrows 708. Heat stored in the first ceramic block heat exchanger 706 is exchanged to the heated gas stream 612 and may increase the temperature to between about 500° C. (about 932° F. and to about 550° C. (about 1022° F.). In another embodiment, the feed is heated to between about 700° C. (about 1292° F.) to about 750° C. (about 1382° F.). In another embodiment, the feed is heated to between about 800° C. (about 1472° F.) to about 850° C. (about 1562° F.).

While the first ceramic block heat exchanger 706 is used to heat the heated gas stream 612, a second ceramic block heater 710 is used to cool the reactor effluent stream 620 by flowing this stream through the second ceramic block heater 710, as indicated by arrows 712. When the second ceramic block heat exchanger 710 reaches a selected temperature, or the first ceramic block heat exchanger 706 drops to a selected temperature, the positions of the inlet valves 714 and outlet valves 716 are changed. In other words, open valves are closed and closed valves are opened. The change in the positions of the valves changes which ceramic block heat exchanger 706 or 710 is being heated by the flow from the reactor 618, as well as which ceramic block heat exchanger 706 or 710 is used to heat the heated gas stream 612. The heat exchangers 610 and 704 may also be used to vaporize a liquid feedstock in preparation for injection into the reactor 618. For example, a portion of each ceramic block heat exchanger 706 and 710 in the second heat exchanger 704 may have a flow path dedicated to flashing the liquid feedstock to a vapor.

The heat may not be sufficient to increase the temperature of the heated gas stream 612 sufficiently for reaction. Thus, as described with respect to FIG. 6, a package heater 614 can be used to further boost the temperature of the heated gas stream 612, forming the hot gas stream 616, which can be fed to the fluidized bed reactor 618. Carbon allotropes are formed in the fluidized bed reactor 618, and carried out in the reactor effluent stream 620.

After flowing through the second ceramic block heater 710, the reactor effluent 620 is flowed to a separation system 718, which is used to remove the carbon allotropes, such as CNTs 624, from the reactor effluent 620. In this embodiment, the separation system 718 for the carbon allotropes includes a cyclonic separator 720, a lock hopper 722, and a filter 724. After the majority of the carbon allotropes are removed by the cyclonic separator 720 and deposited into the lock hopper 722, the filter 724 is used to remove remaining carbon allotropes from the waste gas stream 726. This may help to prevent plugging, or other problems, caused by residual carbon allotropes in the waste gas stream 726. The filter 724 can include bag filters, sintered metal filters, and ceramic filters, among other types. From the separation system 718, the carbon allotropes, such as CNTs 624, may be directed to a packaging system. After the filter 724, the waste gas stream 726 is flowed through the heat exchanger 610 before flowing to the ambient temperature heat exchanger 630 and then fed to a separation vessel 632 for separation of the water 634. After flowing through the separation vessel 632, the flow is as described with respect to FIG. 6.

The individual streams 604 and 656 can be used to supply other gases for the process. For example, a fuel gas stream 728 may be removed from a high methane recycle gas 604 and used for powering turbines, boilers, or other equipment in order to provide power to the system 700 or to an electric grid. Further, a purge gas stream 730 may be removed from a $CO_2$ waste stream 656. The purge gas stream 730 may be used for cooling and purging the CNTs during packaging. The purge gas may also be used for various cleaning functions in the plant, such as blowing residual carbon allotropes out of a ceramic heat exchanger 706 or 710 when flow is reversed.

A similar plant configuration may be used for a high methane feed gas. In this case, however, a gas fractionation system may not be needed, as the resulting gas can be directly recycled without further treatment. Further, the recycle and effluent waste streams can contain substantial quantities of hydrogen and carbon monoxide, e.g., greater than about 1 mol % each, about 5 mol % each, about 10 mol % each, or about 20 mol % of each component. These components will generally be present in the feed and all non-$CO_2$ product streams, i.e., the recycle methane will always contain some CO and $H_2$.

Gas Fractionation System

Figure 8:
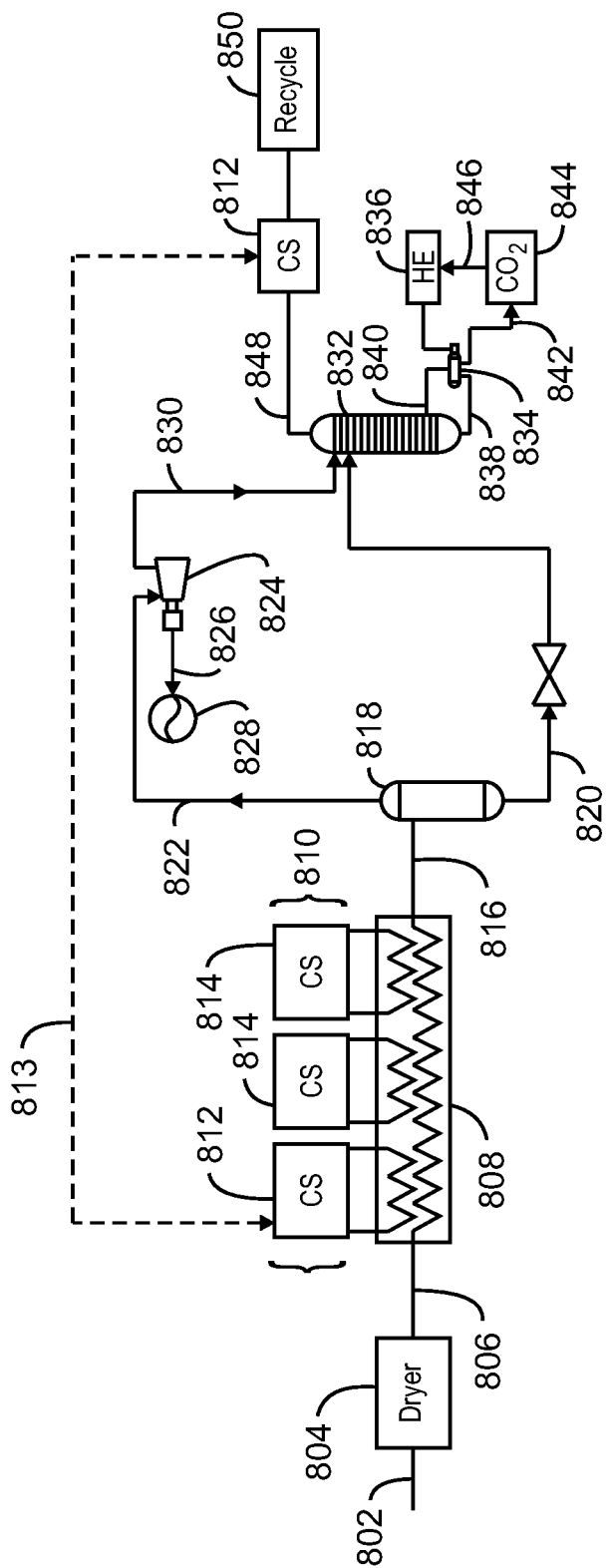
FIG. 8 is a simplified process flow diagram of a gas fractionation system that can be used in a reactor system for the production of carbon nanotubes.

FIG. 8 is a simplified process flow diagram of a gas fractionation system 800 that can be used in a reactor system for the production of carbon nanotubes. The gas fractionation system 800 is a bulk fractionation process that may be used with a high $CO_2$ reactor system, such as that discussed with respect to FIG. 3. Further, the gas fractionation system 800 may be used to purifying a gas stream formed in a gassifier, such as the system discussed with respect to FIG. 3.

In the gas fractionation system 800, a feed gas 802, such as the dried gas stream 652 discussed with respect to FIGS. 6 and 7, is fed to a dryer 804 to reduce the dew point to about −40° C., about −50° C., about −56.7° C. (about −70° F.), about −60° C., about −70° C., about −80° C., or lower. The dryer 804 can be a fixed or fluidized dryer bed, containing an adsorbent, such as molecular sieves, desiccants, and the like. Other dryer technologies may also be used, such as cryogenic drier systems. In some embodiments, the dryer can be located prior to the compressor 644, which may eliminate the need for the ambient temperature heat exchanger 648.

The dry gas feed 806 is then fed through a cryogenic chiller 808 to reduce the temperature in preparation for the separation. As $CO_2$ will condense from the gas at about −61° C. (about −77° F.), a multistage chilling system 810 may be used to reduce the temperature to around this level. The multistage chilling system 810 may include a heat recovery system 812 used to heat the outlet gas with energy 813 from the dry feed gas 806. The multistage chilling system 810 may also include other refrigerant systems 814, such as a medium pressure propane system or a high pressure propane system.

The chilled feed 816 is fed to a separation vessel 818 to separate a liquid stream 820 and a vapor stream 822. The vapor stream 822 is passed through an expander 824 to lower the temperature by generating mechanical work 826 in an adiabatic expansion process. In one embodiment, the mechanical work 826 is used to drive a generator 828, which may provide a portion of the electricity used in the plant. In another embodiment, the mechanical work 826 is used to drive a compressor, for example, for compressing a refrigerant stream for the multistage chilling system 810. The expansion can result in a two phase stream 830.

The liquid stream 820 and the two phase stream 830 are fed to a separation column 832, for example, at different points along the separation column 832. Heat is supplied to the separation column 832 by a reboiler 834. The reboiler 832 is heated by a stream from a heat exchanger 836. The heat exchanger 836 may be part of a chiller system that is warmer than the separation column 832, although below ambient temperature. The column bottom stream 838 is passed through the reboiler 834 and a portion 840 is reinjected after being warmed. An outlet stream 842 from the reboiler 834 provides the $CO_2$ product 844. A portion 846 of the $CO_2$ product 844 may be recycled through the heat exchanger 836 to carry energy to the reboiler 834.

The overhead stream 848 from the separation column 832 is a methane enhanced stream, for example, including about 55 mol % $CH_4$ and about 40 mol % $CO_2$, about 60 mol % $CH_4$ and about 35 mol % $CO_2$, about 70 mol % $CH_4$ and about 25 mol % $CO_2$, about 73 mol % $CH_4$ and about 23 mol % $CO_2$, or about 80 mol % $CH_4$ and about 15 mol % $CO_2$. As noted, the overhead stream 848 may be used in a chiller system 812 to cool the dry gas feed 806 by exchanging heat energy 813 with the dry gas feed 806, warming the overhead stream 848 to form the recycle gas 850. Other components may be present in the recycle gas 850 including, for example, about 1 mol % CO and $H_2$, about 2 mol % CO and $H_2$, about 3.5 mol % CO and $H_2$, about 4 mol % CO and $H_2$, or about 5 mol % CO and $H_2$.

The configurations and units discussed with respect to FIG. 8 are merely exemplary. Any number of variations may be made to these systems. Further, other gas separation systems may be used in embodiments, so long as flow rates and purity levels can be achieved.

Methods for Forming Carbon Allotropes and Catalysts

Figure 9:
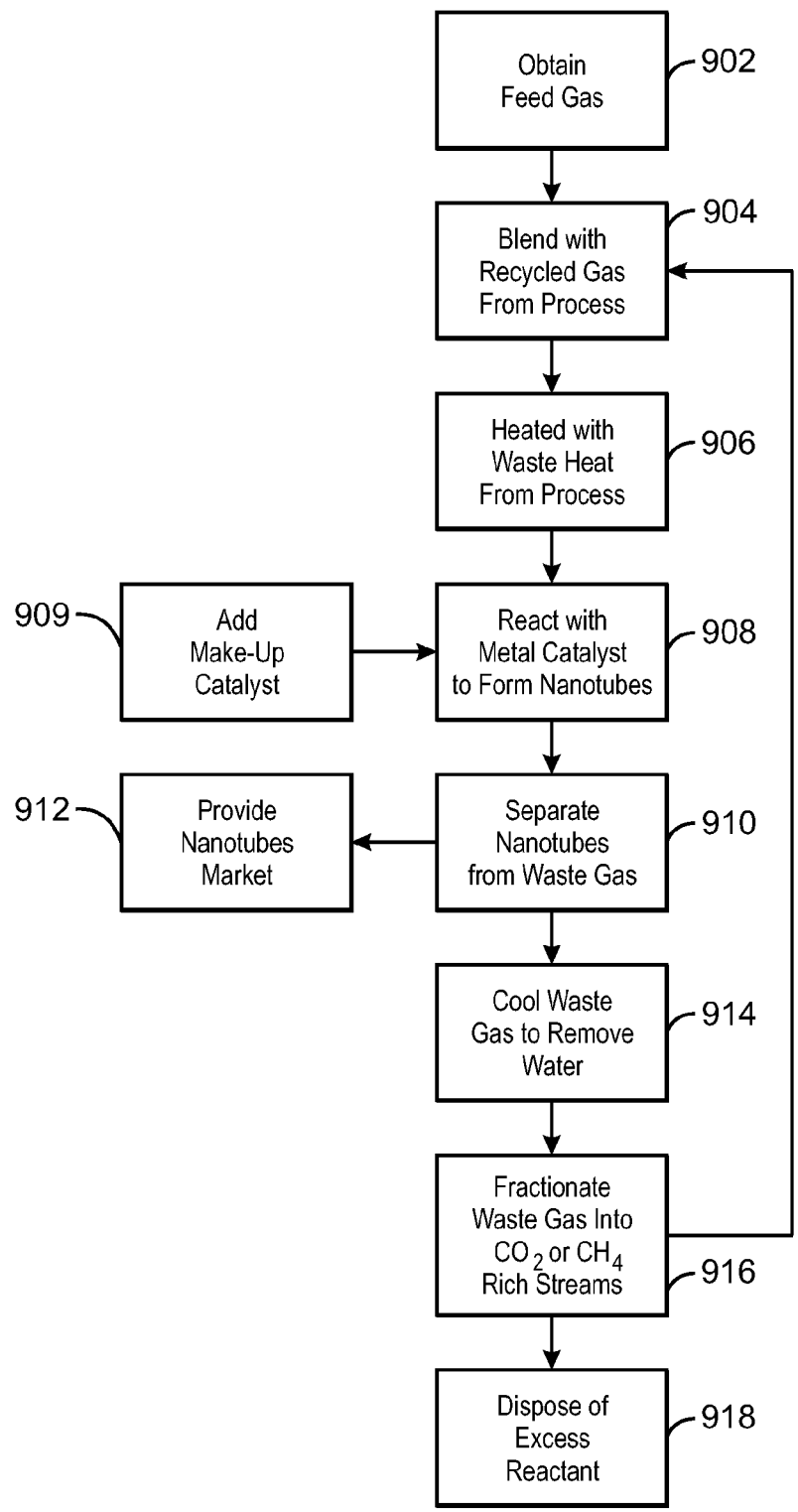
FIG. 9 is a method for generating carbon allotropes, such as carbon nanotubes, from a feed gas that includes methane and carbon dioxide.

FIG. 9 is a method 900 for generating carbon allotropes, such as carbon nanotubes, from a feed gas that includes methane and carbon dioxide. The method 900 begins at block 902, at which a feedstock is obtained. The feed stock may be a mixture of gases, such as $CO_2/CH_4$, and may be obtained from any number of sources. As mentioned, the feedstock may include a natural gas harvested from a sub-surface reservoir, an exhaust gas from a power generation plant, or any number of other gases from hydrocarbon reservoirs, carbonaceous materials, or plant sources. Further, other feedstocks may be used in embodiments, including other materials, such as syngas, CO, $H_2$, other hydrocarbons, and the like.

At block 904, the feedstock is combined with a recycle gas obtained from the wastes gases generated in the process. As described herein, the recycle gas may be obtained from the waste gases by cryogenic gas fractionation, as well as any number of other techniques. At block 906, the combined gas stream is heated with waste heat recovered from the reaction process. After heating, at block 908, the combined gas stream is reacted with a metal catalyst in a reactor to form the CNTs. As described with respect to FIGS. 4A-4D, the catalyst can be formed using any number of techniques that yield a roughened surface. At block 909, make-up catalyst is added to the process to keep the catalyst amount relatively constant.

At block 910 the carbon allotropes, such as CNTs, are separated from the waste gas. At block 912, the separated CNTs are purged, cooled, and packaged to be sent to market. The waste gas is cooled to remove excess water formed during the reaction. As the process is conducted at high temperatures and pressures, an ambient temperature heat exchanger provides sufficient cooling to condense out the water vapor. The processes described at blocks 906-914 will be repeated for each sequential reactor in the reaction system.

At block 916, the waste gas is fractionated into a CO2 enriched stream and a CH4 enriched stream. At block 918, whichever stream contains the excess reagent can be sold, while the other stream can be recycled to block 904 to be used in the process.

Still other embodiments of the claimed subject matter may include any combinations of the elements listed in the following numbered paragraphs:

1. A system for the production of a carbon allotrope, including
a reactor configured to use a catalyst to form the carbon allotrope from a feed stock in a Bosch reaction; and
the catalyst, wherein the catalyst includes a roughened metal surface.

2. The system of paragraph 1, wherein the feed stock includes at least about 10 mol % oxygen.

3. The system of paragraphs 1 or 2, wherein the catalyst includes comminuted metal fragments.

4. The system of any of paragraphs 1-3, wherein the catalyst includes metal shot-blasting beads.

5. The system of any of paragraphs 1-4, wherein the catalyst includes particles between about 25 μm and 600 μm in size.

6. The system of any of paragraphs 1-5, wherein the catalyst includes particles between about 250 and 589 micrometers.

7. The system of any of paragraphs 1-6, wherein the catalyst includes iron.

8. The system of paragraph 7, wherein the catalyst includes nickel, chromium, or any combinations thereof.

9. The system of any of paragraphs 1-8, wherein the catalyst includes metal shavings.

10. The system of any of paragraphs 1-9, wherein the catalyst includes metal fibers.

11. The system of any of paragraphs 1-10, wherein the catalyst includes metal particles.

12. The system of any of paragraphs 1-11, wherein the catalyst includes hematite, magnetite, or Wüstite, or any combinations thereof.

13. The system of any of paragraphs 1-12, wherein the catalyst includes iron carbide.

14. The system of any of paragraphs 1-13, wherein the catalyst includes a mixture of active metal particles and inactive particles.

15. The system of paragraph 14, wherein the inactive particles slow the formation rate for the carbon allotrope.

16. The system of paragraph 14, wherein the inactive particles include alumina, cerium oxides, titania, zirconia, or $Cr_2O_3$, or any combinations thereof.

17. The system of paragraph 14, wherein the inactive particles abrade the active metal particles during the reaction to expose active surfaces.

18. The system of any of paragraphs 1-17, wherein the carbon allotrope includes carbon nanotubes.

19. The system of any of paragraphs 1-18, wherein the reactor is a fluidized bed reactor using a counter-current flow of feed gas to fluidize the catalyst.

20. The system of any of paragraphs 1-19, wherein:
the catalyst includes particles in a Geldart class D size range; and
the reactor has a spouted bed.

21. A method for forming a catalyst for the formation of carbon nanotubes, including creating a catalyst having a roughened metal surface.

22. The method of paragraph 21, including subjecting a metal to comminution to form the catalyst.

23. The method of paragraphs 21 or 22, including forming comminuted metal fragments by shot peening a metal.

24. The method of any of paragraphs 21-23, including forming comminuted metal fragments by grinding a metal.

25. The method of any of paragraphs 21-24, including forming a comminuted metal by scraping metal shavings from a metal surface.

26. The method of any of paragraphs 21-25, including forming the catalyst by cryogenically shattering a metal.

27. The method of any of paragraphs 21-26, including forming the catalyst by forming droplets from a molten metal.

28. The method of any of paragraphs 21-27, including quenching the droplets in a liquid.

29. The method of any of paragraphs 21-28, including forming the catalyst by:
partially oxidizing a metal surface to form a partially oxidized metal surface; and
reducing the partially oxidized metal surface to form a rough surface.

30. The method of any of paragraphs 21-29, including forming the catalyst by:
creating an alloy of a catalytic metal with aluminum; and
etching away the aluminum to leave a roughened metal surface.

31. The method of any of paragraphs 21-30, including forming the catalyst by treating a metal surface with an acid.

32. A method for forming carbon nanotubes, including:
forming carbon nanotubes on a catalyst in a reactor using a Bosch reaction, wherein the catalyst includes a comminuted metal surface;
separating the carbon nanotubes from a reactor effluent to form a waste stream;
heating a feed gas, a dry waste gas stream, or both, with waste heat from the waste stream; and
chilling the waste stream in an ambient temperature heat exchanger to condense water vapor, forming the dry waste gas stream.

33. The method of paragraph 32, including forming the catalyst by cold working a metal to expose a roughened metal surface.

34. The method of paragraph 32 or 33, including recycling at least a portion of the dry waste gas stream to the reactor.

35. The method of any of paragraphs 32-34, including adding catalyst to the reactor to keep a substantially even amount of catalyst in the reactor.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A system for the production of a carbon allotrope, comprising:
a reactor configured to react a feed stock with a catalyst in a Bosch reaction to form the carbon allotrope comprising carbon nanotubes, the reactor comprising a first inlet to receive the catalyst, a second inlet to receive the feed stock, and an outlet to discharge a reactor effluent comprising the carbon allotrope and catalyst;
the catalyst, wherein the catalyst prior to delivery to the reactor comprises a roughened metal surface created by forming droplets of a molten metal and quenching the droplets in a liquid, or by shot peening the catalyst against a surface, or by partially oxidizing a metal surface followed by reduction of the metal surface, or by creating an alloy of a catalytic metal with aluminum and etching the alloy followed by cryogenic fracturing of the alloy, or by any combinations thereof; and
a catalyst separator comprising a cyclonic separator to separate the catalyst from the reactor effluent for return of the catalyst to the reactor.

2. The system of claim 1, wherein the feed stock comprises at least about 10 mol % oxygen, and wherein the reactor is configured for continuous operation to react the feed stock comprising a carbon oxide with the catalyst in the Bosch reaction to form the carbon allotrope and to receive catalyst via the first inlet during formation of the carbon allotrope.

3. The system of claim 1, comprising:
a conduit coupled to the second inlet to route the feed stock to the reactor, wherein the second inlet is at a bottom of the reactor; and
a control valve disposed along the conduit to regulate flow of the feed stock to the reactor, wherein the reactor comprises a distributor plate in the reactor to pass the feed stock to fluidize the catalyst in the reactor, and wherein the catalyst comprises metal shot-blasting beads.

4. The system of claim 1, comprising:
a catalyst vessel;
a conduit coupling the catalyst vessel to the first inlet to route the catalyst from the catalyst vessel to the reactor; and
a valve disposed along the conduit to meter a flow of the catalyst to the reactor, wherein the catalyst comprises particles between about 25 µm and 600 µm in size.

5. The system of claim 1, wherein the catalyst comprises particles between about 250 and 589 micrometers.

6. The system of claim 1, wherein the catalyst comprises iron.

7. The system of claim 6, wherein the catalyst comprises nickel, or chromium, or any combinations thereof.

8. The system of claim 1, wherein the catalyst comprises a comminuted metal comprising metal shavings scraped from a metal to create the roughened metal surface on the metal shavings.

9. The system of claim 1, wherein the catalyst comprises metal fibers.

10. The system of claim 1, comprising a catalyst-generation system to implement the liquid quenching a molten metal, or shot peening the catalyst against a surface, or partially oxidizing a metal surface followed by reduction of the metal surface, or creating an alloy of a catalytic metal with aluminum and etching the alloy followed by cryogenic fracturing of the alloy, or any combinations thereof, wherein the catalyst comprises metal particles.

11. The system of claim 1, wherein the catalyst comprises hematite, magnetite, or Wüstite, or any combinations thereof.

12. The system of claim 1, wherein the catalyst comprises iron carbide.

13. The system of claim 1, wherein the catalyst comprises a mixture of active metal particles and inactive particles, and wherein the inactive particles slow the formation rate for the carbon allotrope.

14. The system of claim 13, wherein the inactive particles comprise alumina, cerium oxides, titania, zirconia, or $Cr_2O_3$, or any combinations thereof, and wherein the inactive particles abrade the active metal particles during the reaction to expose active surfaces.

15. The system of claim 1, wherein the reactor is a fluidized bed reactor comprising the second inlet at a bottom of the reactor to receive a feed gas comprising the feed stock to fluidize the catalyst in the reactor.

16. The system of claim 1, wherein:
the catalyst comprises particles in a Geldart class D size range; and
the reactor has a spouted bed.

17. The system of claim 1, wherein:
the catalyst comprises catalyst particles having the roughened metal surface;
the forming droplets of a molten metal and quenching the droplets in a liquid comprises forming the droplets and adding the droplets into a liquid quench forming roughened metal particles comprising the catalyst particles having the roughened metal surface;
the shot peening of the catalyst against the surface fragments the catalyst into fragments as the catalyst particles;
partially oxidizing and reducing the metal surface comprises partially oxidizing the metal surface to form a partially oxidized metal surface, and reducing the partially oxidized metal surface to form the roughened metal surface; and
etching the alloy followed by cryogenic fracturing comprises etching at least some of the aluminum from the alloy to a form a porous structure comprising the catalytic metal and cryogenic fracturing the porous structure to give the catalyst particles having the roughened metal surface.

18. A system for the production of a carbon allotrope, comprising:
a reactor configured to react a feed stock with a catalyst in a Bosch reaction to form the carbon allotrope comprising carbon nanotubes, the reactor comprising a first inlet to receive the catalyst, a second inlet to receive the feed stock, and an outlet to discharge a reactor effluent comprising the carbon allotrope and catalyst;
the catalyst, wherein the catalyst prior to delivery to the reactor comprises a roughened metal surface created by forming droplets of a molten metal and quenching the droplets in a liquid, or by shot peening the catalyst against a surface, or by partially oxidizing a metal surface followed by reduction of the metal surface, or by creating an alloy of a catalytic metal with aluminum and etching the alloy followed by cryogenic fracturing of the alloy, or by any combinations thereof;
a catalyst separator to separate the catalyst from the reactor effluent for return of the catalyst to the reactor;
a separator to receive the reactor effluent discharged from the catalyst separator and to separate the reactor effluent into a carbon allotrope stream and a waste gas stream;
a first heat exchanger to heat the feed stock with waste heat from the waste gas stream;
a second heat exchanger to condensed water in the waste gas stream to form a dry waste gas stream; and
a third heat exchanger to condense residual water in the dry waste gas stream, wherein the catalyst comprises comminuted metal fragments.

19. The system of claim 18, comprising:
a gas fractionation system to process the dry waste gas stream to give a recycle gas; and
a static mixer to mix the recycle gas with the feed stock upstream of the reactor.

20. A method for forming carbon nanotubes, comprising:
forming carbon nanotubes on a catalyst in a reactor in a Bosch-reaction, wherein the catalyst prior to receipt by the reactor comprises a roughened metal surface created by forming droplets of a molten metal and quenching the droplets in a liquid, or by partially oxidizing a metal surface followed by reduction of the metal surface, or by creating an alloy of a catalytic metal with aluminum and etching the alloy followed by cryogenic fracturing of the etched alloy, or by shot peening of the catalyst against a surface to fragment the catalyst, or by any combinations thereof;
separating the carbon nanotubes from a reactor effluent to form a waste stream;
heating, via a heat exchanger, a feed gas with waste heat from the waste stream;
chilling the waste stream in an ambient temperature heat exchanger to condense water vapor, forming a dry waste gas stream;
compressing, via a compressor, the dry waste gas stream;
condensing water vapor in the dry waste gas stream in a second ambient temperature heat exchanger downstream of the compressor;
processing in a fractionation system the dry waste gas stream discharged from the second ambient temperature heat exchanger; and
recycling a portion of the dry waste gas stream from the fractionation system to the reactor.

21. The method of claim 20, comprising forming the catalyst by cold working a metal to expose the roughened metal surface.

22. The method of claim 20, comprising adding catalyst to the reactor to keep a substantially even amount of catalyst in the reactor, wherein forming carbon nanotubes on the catalyst in the reactor in the Bosch reaction comprises reacting the feed gas with the catalyst, and wherein recycling the portion of the dry waste gas stream to the reactor from the fractionation system comprises mixing, via a static mixer, the portion into a stream of the feed gas to the reactor.

* * * * *